(12) United States Patent
Ohno

(10) Patent No.: US 11,583,456 B2
(45) Date of Patent: Feb. 21, 2023

(54) WHEELCHAIR PASSENGER RESTRAINT STRUCTURE

(71) Applicant: Toyota Jidosha Kabushiki Kaisha, Toyota (JP)

(72) Inventor: Mitsuyoshi Ohno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 17/009,150

(22) Filed: Sep. 1, 2020

(65) Prior Publication Data

US 2021/0154063 A1 May 27, 2021

(30) Foreign Application Priority Data

Nov. 25, 2019 (JP) .............................. JP2019-212708

(51) Int. Cl.
*A61G 3/08* (2006.01)
*B60R 22/24* (2006.01)

(52) U.S. Cl.
CPC ............ *A61G 3/0808* (2013.01); *B60R 22/24* (2013.01)

(58) Field of Classification Search
CPC .................................................. A61G 3/0808
See application file for complete search history.

(56) References Cited

U.S. PATENT DOCUMENTS

| 7,455,490 | B1* | 11/2008 | Goosen | A61G 3/0808 |
| | | | | 410/7 |
| 2002/0064433 | A1* | 5/2002 | Constantin | A61G 3/0808 |
| | | | | 410/7 |
| 2006/0093452 | A1* | 5/2006 | Sakano | A61G 3/0808 |
| | | | | 410/7 |
| 2006/0159542 | A1* | 7/2006 | Ditch | A61G 3/0808 |
| | | | | 410/7 |
| 2011/0002764 | A1* | 1/2011 | Darnell | A61G 3/062 |
| | | | | 414/550 |
| 2018/0193210 | A1* | 7/2018 | Aitchison | B60N 2/14 |
| 2019/0262198 | A1* | 8/2019 | Girardin | B60R 22/22 |
| 2020/0113754 | A1* | 4/2020 | Girardin | A61G 3/0808 |
| 2021/0053528 | A1* | 2/2021 | Sekizuka | B60R 22/48 |

FOREIGN PATENT DOCUMENTS

| CA | 3055903 | A1 | * | 3/2020 | ............ A61G 3/062 |
| CN | 112168511 | A | * | 1/2021 | ............ A61G 3/0808 |
| CN | 112336531 | A | * | 2/2021 | ............ A61G 3/0808 |
| CN | 113194901 | A | * | 7/2021 | ............ A61G 3/006 |
| DE | 3133448 | A1 | | 3/1983 | |
| DE | 3204665 | A1 | * | 8/1983 | |
| DE | 102007001865 | A1 | * | 8/2007 | ............ A61G 3/0808 |

(Continued)

*Primary Examiner* — Nicole T Verley
(74) *Attorney, Agent, or Firm* — Dinsmore & Shohl LLP

(57) ABSTRACT

A wheelchair passenger restraint structure includes: a wheelchair space set in a vehicle cabin so that a passenger of a wheelchair is to be boarded in a forward facing posture; a seatbelt configured to restrain an abdomen part of the passenger of the wheelchair boarded in the wheelchair space; a vertical wall provided behind the wheelchair space in the vehicle-body front-rear direction; and a holding member supported by the vertical wall, the holding member being configured to hold a seating face of the wheelchair from below in the vehicle-body up-down direction.

20 Claims, 11 Drawing Sheets

(56) References Cited

FOREIGN PATENT DOCUMENTS

| EP | 1878609 A2 | | 1/2008 | |
|---|---|---|---|---|
| EP | 3597162 A1 | * | 1/2020 | |
| JP | 2001-047969 A | | 2/2001 | |
| JP | 2012065745 A | * | 4/2012 | |
| JP | 5260389 B2 | * | 8/2013 | |
| JP | 2015-085068 A | | 5/2015 | |
| JP | 2021074505 A | * | 5/2021 | |
| JP | 2022023403 A | * | 2/2022 | |
| JP | 2022044347 A | * | 3/2022 | |
| WO | WO-2009142576 A1 | * | 11/2009 | ........... A61G 3/0808 |
| WO | 2013/045732 A1 | | 4/2013 | |
| WO | WO-2015076763 A1 | * | 5/2015 | ............. A61G 3/062 |
| WO | WO-2021219693 A1 | * | 11/2021 | ........... B64D 11/062 |

* cited by examiner

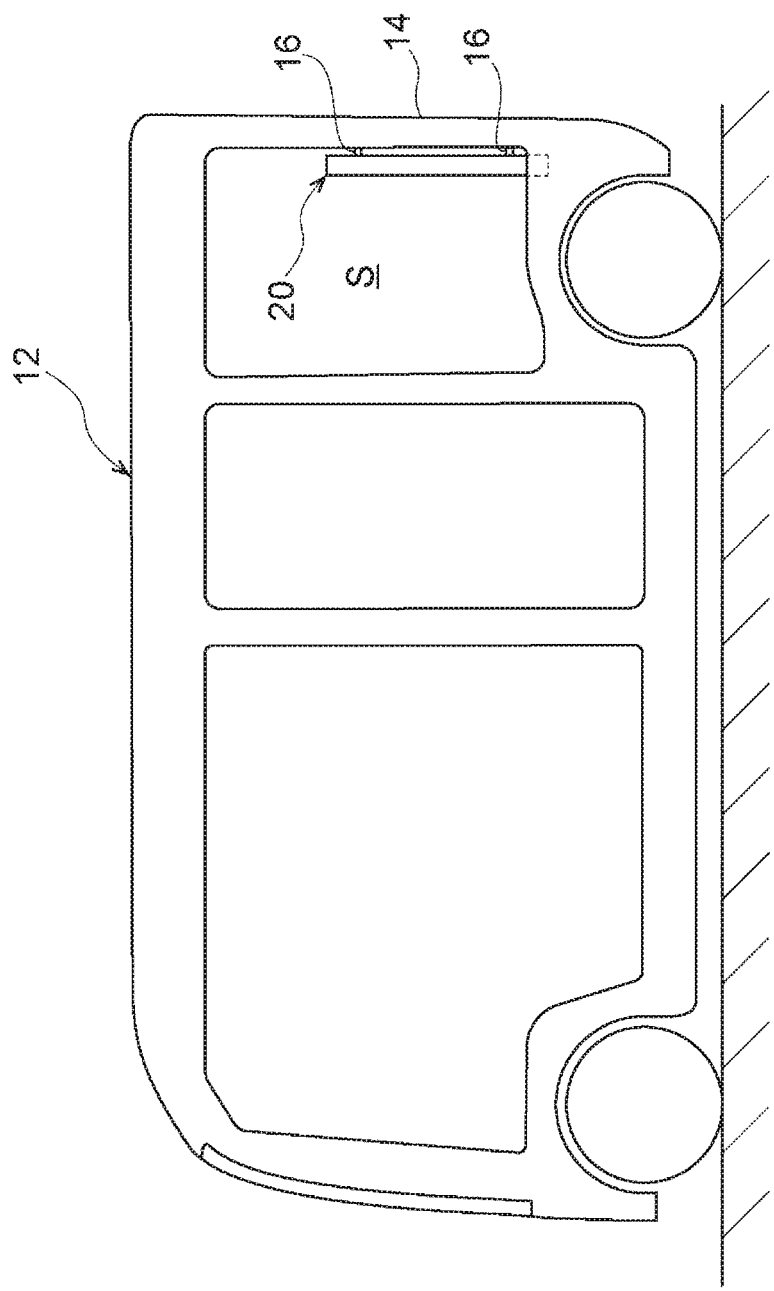
FIG. 1
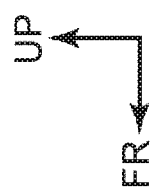

WHEELCHAIR PASSENGER RESTRAINT STRUCTURE

CROSS-REFERENCE TO RELATED APPLICATION

This application claims priority to Japanese Patent Application No. 2019-212708 filed on Nov. 25, 2019, incorporated herein by reference in its entirety.

BACKGROUND

1. Technical Field

The present disclosure relates to a wheelchair passenger restraint structure.

2. Description of Related Art

There has been conventionally known a bus configured such that, when a foldable seat on a right wall side where no entrance door is provided is folded to form a space, one wheelchair in a facing forward posture can be fixed on each of the front side and the rear side in the space (e.g., see Japanese Unexamined Patent Application Publication No. 2015-85068 (JP 2015-85068 A)). Further, there has been also conventionally known a bus configured such that one wheelchair in a facing forward posture can be fixed on each of the front side and the rear side in a right space in a central part of a vehicle cabin, and one wheelchair in a facing forward posture can be fixed on each of the right side and the left side in a space in a rear part of the vehicle cabin (e.g., see Japanese Unexamined Patent Application Publication No. 2001-47969 (JP 2001-47969 A)).

SUMMARY

In the meantime, in a vehicle such as a bus that may travel at a high speed, it is common to restrain a passenger of a wheelchair in a rearward facing posture. However, some passengers of wheelchairs often have such a request that they want to be boarded in a vehicle in a forward facing posture while they are sitting on their wheelchairs. In the meantime, in a case where a passenger of a wheelchair is boarded in a vehicle in a forward facing posture, when the vehicle has a front end collision, a submarine phenomenon may occur to the passenger.

That is, in the front end collision of the vehicle, a load directed forward in the vehicle front-rear direction might be combined with a load caused by a seatbelt to be directed diagonally rearward in the vehicle front-rear direction and downward in the vehicle up-down direction when the vehicle is viewed from the vehicle width direction, so that a load directed diagonally forward in the vehicle front-rear direction and downward in the vehicle up-down direction might be applied to the passenger of the wheelchair who wears a seatbelt across the abdomen part. On this account, when the wheelchair does not have a sufficient seating face strength, the passenger of the wheelchair might move diagonally forward in the vehicle front-rear direction and downward in the vehicle up-down direction (a submarine phenomenon occurs).

In view of this, an object of the present disclosure is to provide a wheelchair passenger restraint structure that can restrain occurrence of a submarine phenomenon to a passenger of a wheelchair who is boarded in a forward facing posture in a vehicle, even when the vehicle has a front end collision.

In order to achieve the above object, a wheelchair passenger restraint structure according to a first aspect of the present disclosure includes a wheelchair space, a seatbelt, a vertical wall, and a holding member. The wheelchair space is set in a vehicle cabin so that a passenger of a wheelchair is to be boarded in a forward facing posture. The seatbelt is configured to restrain an abdomen part of the passenger of the wheelchair boarded in the wheelchair space. The vertical wall is provided behind the wheelchair space in the vehicle-body front-rear direction. The holding member is supported by the vertical wall, and the holding member is configured to hold a seating face of the wheelchair from below in the vehicle-body up-down direction.

In the present disclosure according to the first aspect, the seating face of the wheelchair boarded in a forward facing posture is held, from below in the vehicle-body up-down direction, by the holding member supported by the vertical wall. That is, insufficiency in a seating face strength of the wheelchair is restrained by the holding member. Accordingly, even when a vehicle on which the passenger of the wheelchair is boarded has a front end collision and a load directed diagonally forward in the vehicle-body front-rear direction and downward in the vehicle-body up-down direction is applied to the passenger of the wheelchair, the load is received by the holding member. This accordingly restrains the passenger of the wheelchair from moving diagonally forward in the vehicle-body front-rear direction and downward in the vehicle-body up-down direction, thereby making it possible to restrain occurrence of a submarine phenomenon to the passenger of the wheelchair.

Further, a wheelchair passenger restraint structure according to a second aspect may be configured as follows. That is, in the wheelchair passenger restraint structure according to the first aspect, a position of the holding member in the vehicle-body up-down direction may be adjustable relative to the vertical wall.

In the present disclosure according to the second aspect, a position of the holding member in the vehicle-body up-down direction is adjustable relative to the vertical wall. Accordingly, even if the height of the seating face varies depending on the type (difference in specification) of the wheelchair, the holding member can deal with the variation.

Further, a wheelchair passenger restraint structure according to a third aspect may be configured as follows. That is, in the wheelchair passenger restraint structure according to the first or second aspect, the holding member may be configured to be storable on and unfoldable from the vertical wall.

In the present disclosure according to the third aspect, the holding member is storable on and unfoldable from the vertical wall. Accordingly, when the passenger of the wheelchair is not boarded, the holding member can be stored. This restrains the holding member from being obstructive, thereby making it possible to effectively use a space of the vehicle cabin.

Further, a wheelchair passenger restraint structure according to a fourth aspect may be configured as follows. That is, in the wheelchair passenger restraint structure according to the first or second aspect, the holding member may be configured to be attachable to and detachable from the vertical wall.

Generally, cross pipes are provided in a lower side of a rear part of the wheelchair so that the wheelchair is easily foldable. On this account, when the holding member is provided so as not be removable from the vertical wall, the holding member is passed through a space between the cross pipes from a relatively rear side in the vehicle-body front-rear direction and inserted to a bottom face side of the seating face of the wheelchair along with a rearward movement of the wheelchair. This makes it difficult to set the holding member to have a large width. On the other hand, in the present disclosure according to the fourth aspect, the holding member is attachable to and detachable from the vertical wall. This accordingly allows the holding member to be inserted to the bottom face side of the seating face of the wheelchair from the front side in the vehicle-body front-rear direction, thereby making it possible to set the holding member to have a large width.

Further, a wheelchair passenger restraint structure according to a fifth aspect may be configured as follows. That is, in the wheelchair passenger restraint structure according to any one of the first to fourth aspects, the holding member may include a support member configured to be storable on and unfoldable from the holding member and to support a front part of the holding member from below in the vehicle-body up-down direction.

In the present disclosure according to the fifth aspect, the holding member includes the support member configured to support the front part of the holding member from below in the vehicle-body up-down direction. Accordingly, a load transmitted to the front part of the holding member is transmitted to a floor of the vehicle cabin via the support member. This accordingly improves a withstand load of the holding member when the vehicle has a front end collision.

Further, a wheelchair passenger restraint structure according to a sixth aspect may be configured as follows. That is, in the wheelchair passenger restraint structure according to the fifth aspect, the length of the support member may be adjustable.

In the present disclosure according to the sixth aspect, the length of the support member is adjustable. Accordingly, even if the height of the seating face varies depending on the type (difference in specification) of the wheelchair, the holding member can deal with the variation.

Further, a wheelchair passenger restraint structure according to a seventh aspect may be configured as follows. That is, in the wheelchair passenger restraint structure according to the fifth or sixth aspect, a lower end part of the support member may be lockable to a locking portion provided on a floor of the vehicle cabin.

In the present disclosure according to the seventh aspect, the lower end part of the support member is locked to the locking portion provided on the floor of the vehicle cabin. Accordingly, a load transmitted to the front part of the holding member is efficiently transmitted to the floor of the vehicle cabin via the support member and the locking portion. This accordingly further improves a withstand load of the holding member when the vehicle has a front end collision.

Thus, with the present disclosure, even when a passenger of a wheelchair is boarded on a vehicle in a forward facing posture and the vehicle has a front end collision, it is possible to restrain occurrence of a submarine phenomenon to the passenger of the wheelchair.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 1 is a side view illustrating a bus including a wheelchair passenger restraint structure according to the present embodiment;

DETAILED DESCRIPTION OF EMBODIMENTS

Figure 2:
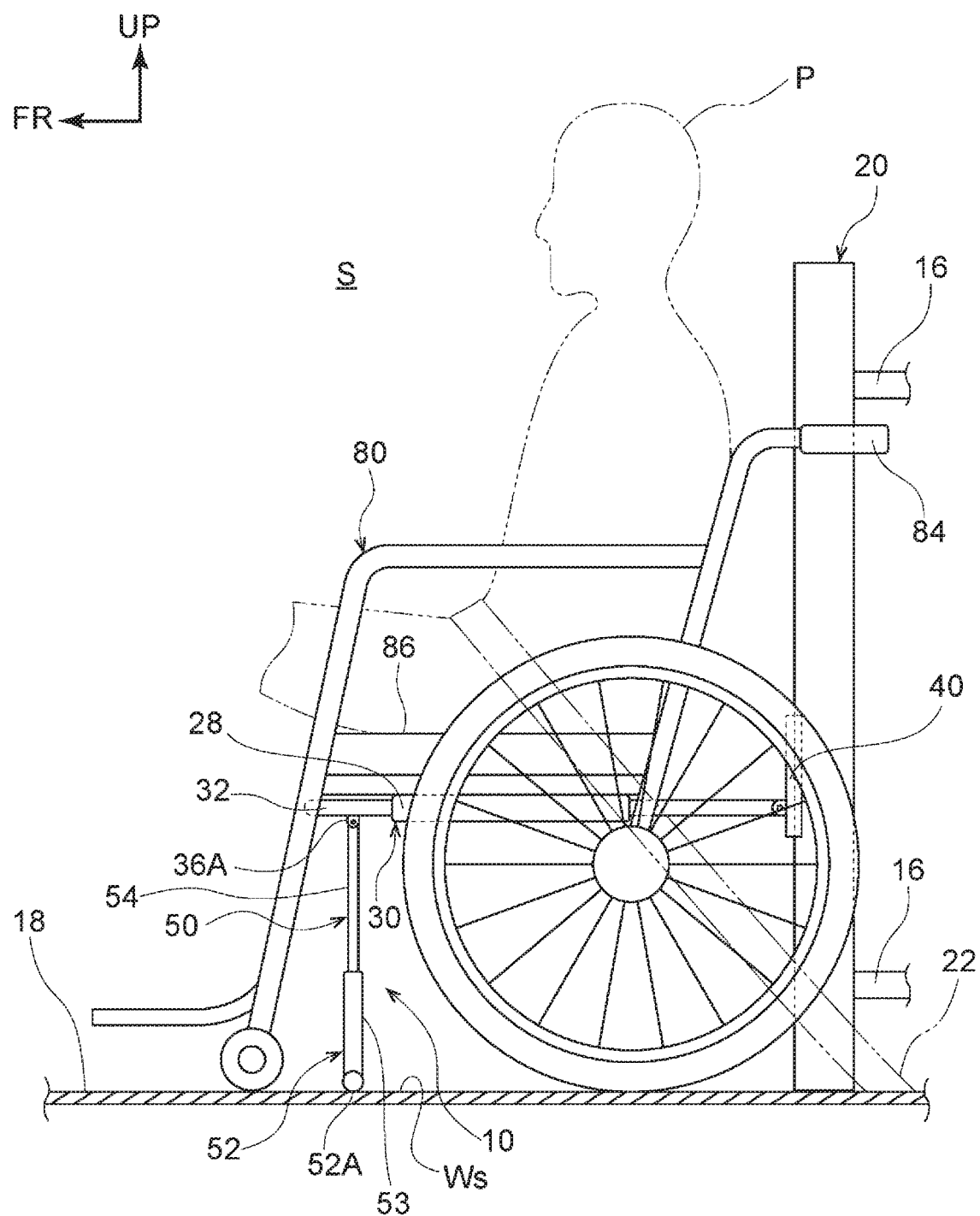
FIG. 2 is a side view illustrating the wheelchair passenger restraint structure according to a first embodiment.

The following describes an embodiment of the present disclosure in detail with reference to the drawings. A wheelchair passenger restraint structure 10 (see FIG. 2) according to the present embodiment is applied to a shared vehicle on which an unspecified number of passengers including a passenger P of a wheelchair 80 (see FIG. 2) are boarded, and the wheelchair passenger restraint structure 10 is used for the passenger P of the wheelchair 80, the passenger P being boarded on the shared vehicle in a forward facing posture. The following description deals with a bus 12 (see FIG. 1) as an example of the shared vehicle.

Note that, for convenience of description, in each of the drawings, an arrow UP indicates the upper side in the vehicle-body up-down direction of the bus 12, an arrow FR indicates the front side in the vehicle-body front-rear direction of the bus 12, and an arrow RH indicates the right side in the vehicle-body right-left direction of the bus 12. Accordingly, in the following description, when the upper and lower sides, the front and rear sides, and the right and left sides are described without any special mention, they respectively indicate the upper and lower sides in the vehicle-body up-down direction, the front and rear sides in the vehicle-body front-rear direction, and the right and left sides in the vehicle-body right-left direction (the vehicle width direction). Further, a view of the bus 12 when it is viewed from the vehicle width direction is referred to as a "side view," and a view of the bus 12 when it is viewed from the front side in the vehicle-body front-rear direction is referred to as a "front view."

First Embodiment

The following first describes the wheelchair passenger restraint structure 10 according to a first embodiment. As illustrated in FIG. 1, a vertical wall 20 is provided in a rear part of the bus 12. The vertical wall 20 is supported by four brackets 16 (one bracket 16 is provided on each of the upper side, the lower side, the right side, and the left side) projecting from a rear wall 14 of the bus 12, for example. A lower end part of the vertical wall 20 makes contact with a floor 18 (see FIG. 2) of a vehicle cabin S. Note that the lower end part of the vertical wall 20 may be distanced from the floor 18 of the vehicle cabin S.

Figure 3:
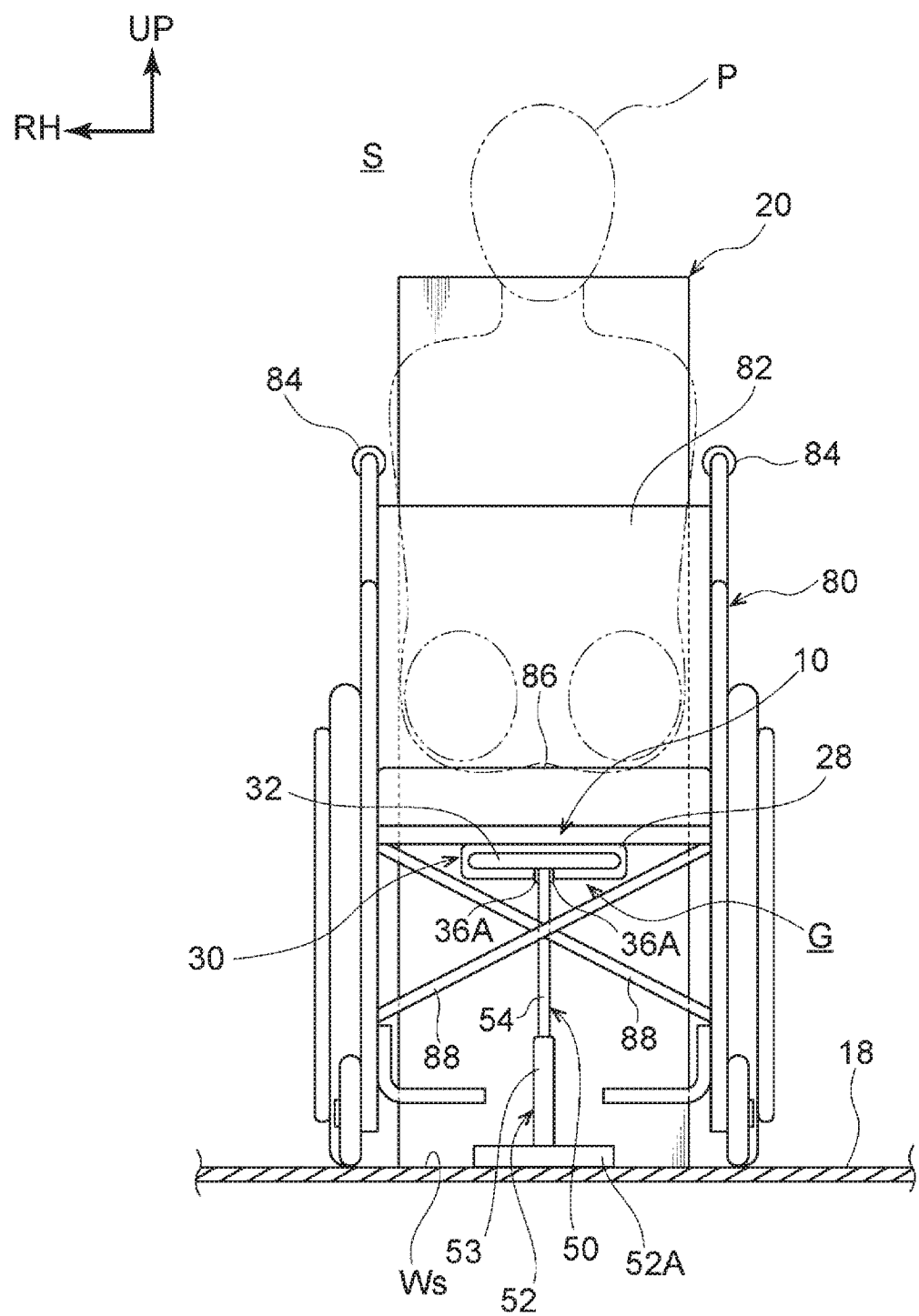
FIG. 3 is a front view illustrating the wheelchair passenger restraint structure according to the first embodiment.

As illustrated in FIGS. 2, 3, the vertical wall 20 is formed such that the height of the vertical wall 20 is higher than the height of the wheelchair 80 but is smaller than the height of an adult passenger P seated in the wheelchair 80. The vertical wall 20 is formed such that the width of the vertical wall 20 is generally the same as the width of a back support 82 (see FIG. 3) of the wheelchair 80. That is, the vertical wall 20 is placeable between push-handles 84 of the wheelchair 80. Note that the thickness of the vertical wall 20 should be a thickness that sufficiently secures the rigidity of the vertical wall 20.

A space in front of the vertical wall 20 is a wheelchair space Ws set in the vehicle cabin S so that the passenger P of the wheelchair 80 is boarded in a forward facing posture. In other words, the vertical wall 20 is placed behind the wheelchair space Ws. The abdomen part of the passenger P of the wheelchair 80 boarded in the wheelchair space Ws is restrained by a seatbelt 22 (see FIG. 2).

Further, the vertical wall 20 is provided with a support frame 30 as a holding member in the first embodiment. The support frame 30 is placed on a bottom face side of a seating face 86 of the wheelchair 80 boarded in the wheelchair space Ws set in front of the vertical wall 20, so that the support frame 30 supports the seating face 86 from below.

That is, the passenger P of the wheelchair 80 moves backward toward the vertical wall 20 to be boarded in the wheelchair space Ws. At this time, the support frame 30 in an unfolded state (a support leg 50 (described later) is in a stored state) is inserted through a gap G above cross pipes 88 from a relatively rear side. Hereby, a cushion portion 28 (described later) of the support frame 30 is placed on the bottom face side of (right under) the seating face 86 of the wheelchair 80.

Figure 4:
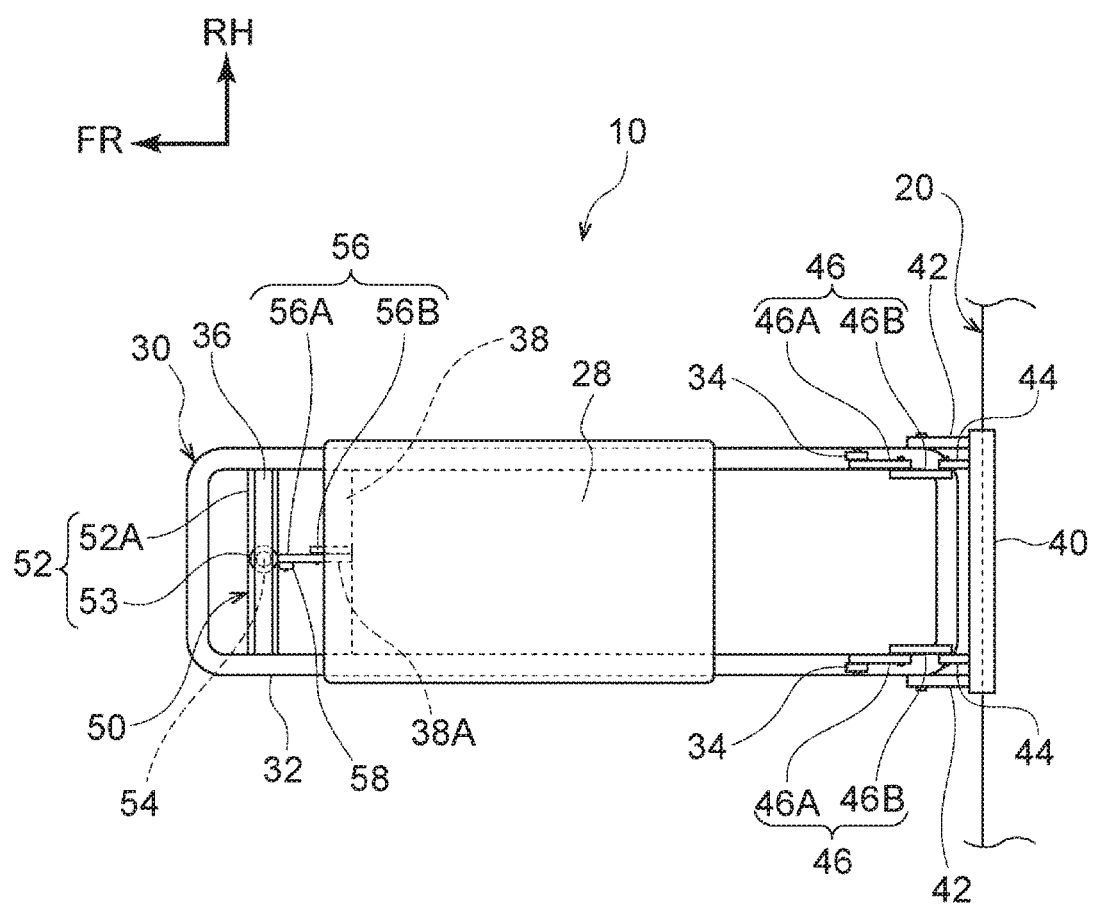
FIG. 4 is a plan view illustrating a support frame constituting the wheelchair passenger restraint structure according to the first embodiment.
Figure 5:
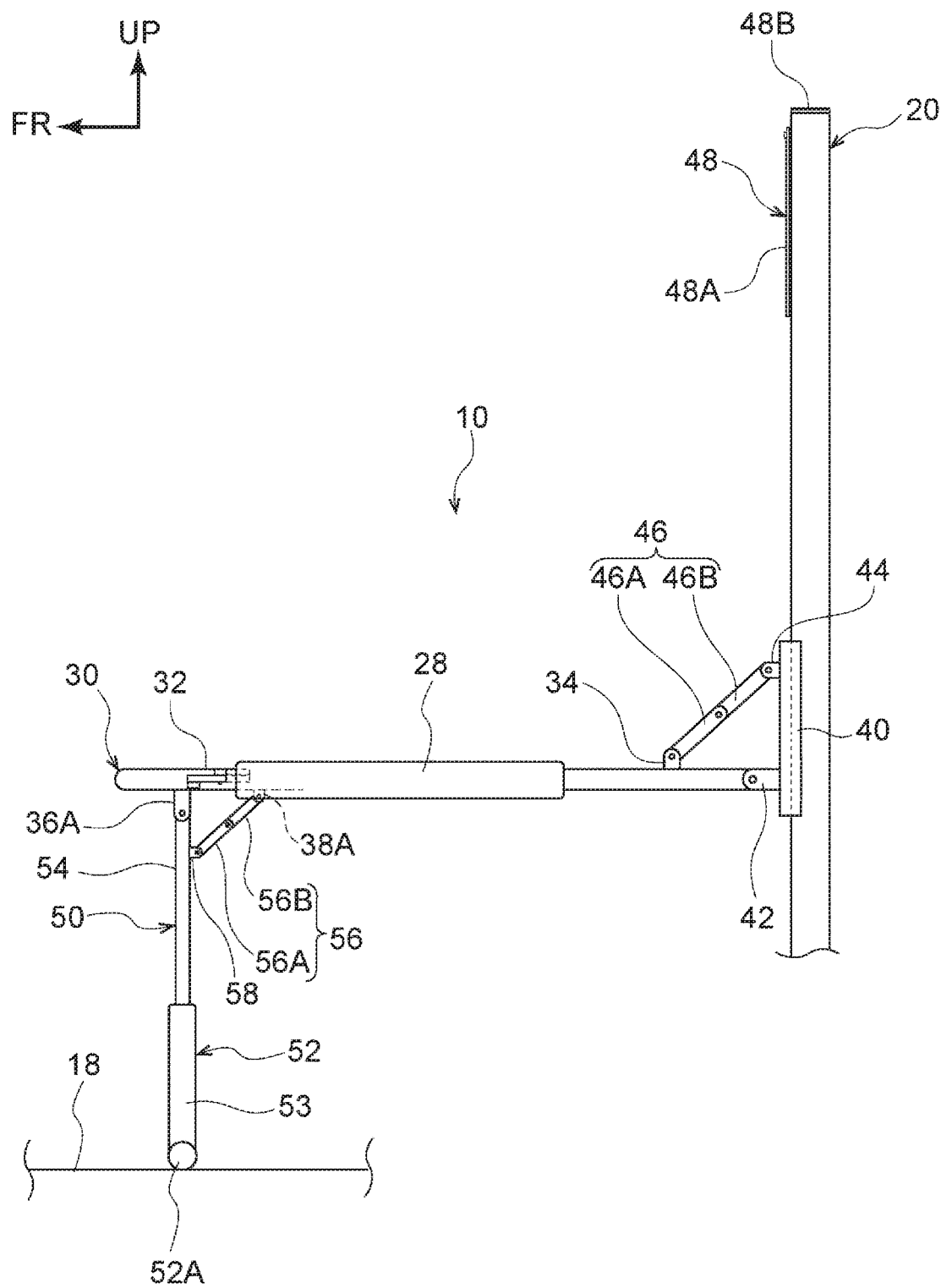
FIG. 5 is a side view illustrating an unfolded state of the support frame constituting the wheelchair passenger restraint structure according to the first embodiment.

As illustrated in FIGS. 4, 5, in the unfolded state where the support frame 30 is placed on the bottom face side of the seating face 86 of the wheelchair 80, the support frame 30 includes a body portion 32 having generally rectangular annular shape (frame shape) in a plan view with its longitudinal direction being along the front-rear direction, and the cushion portion 28 attached by fitting the cushion portion 28 in the body portion 32.

The body portion 32 is constituted by a metal pipe, and the width of the body portion 32 is set to a width that allows the body portion 32 to pass through the gap G above the cross pipes 88 provided in the wheelchair 80. A pair of right and left flat-shaped brackets 42 is provided such that rear end parts of right and left outer surfaces of the body portion 32 are pivotally connected to the right and left flat-shaped brackets 42, respectively. The brackets 42 project forward from lower parts in right and left ends of a support plate 40 having a rectangular flat shape, and a rear part of the body portion 32 is placed between the brackets 42.

Further, a rear face part of the support plate 40 is supported to be movable in the up-down direction along a guide rail (not shown) provided in the vertical wall 20 and to be stoppable at a given position. Hereby, the height position (the position in the up-down direction) of the support frame 30 is adjustable. Note that, as the configuration to move the support plate 40 along the guide rail in the up-down direction and to stop the support plate 40, a configuration equivalent to a well-known seatbelt adjustable anchor, for example, is employable.

Further, flat-shaped brackets 34 are integrally provided on a top face of the rear part of the body portion 32 so as to project upward, and a pair of right and left flat-shaped brackets 44 is also provided so as to project forward. The right and left flat-shaped brackets 44 are integrally provided on respective top parts of right and left ends of the support plate 40. The brackets 34 are connected to the brackets 44, respectively, via respective connecting members 46.

The connecting members 46 are each constituted by two elongated flat-shaped plates 46A, 46B, and a first end part of the plate 46A is pivotally connected to a first end part of the plate 46B. A second end part of the plate 46A is pivotally connected to the bracket 34, and a second end part of the plate 46B is pivotally connected to the bracket 44. Due to the connecting member 46, the support frame 30 in the unfolded state is supported by the vertical wall 20 via the support plate 40 and the guide rail.

The cushion portion 28 is made of an elastically deformable material into a tubular shape having a predetermined length (a length generally the same length, in the front-rear direction, of the seating face 86 of the wheelchair 80). The cushion portion 28 is fitted in the body portion 32 from the front side so as to be attached to the body portion 32. In other words, the body portion 32 is inserted into the cushion portion 28, and the cushion portion 28 is fixed to the body portion 32 at a predetermined position by fasteners such as screws. Note that the predetermined position as used herein indicates a position at which the cushion portion 28 can be placed right under the seating face 86 of the wheelchair 80.

Figure 6:
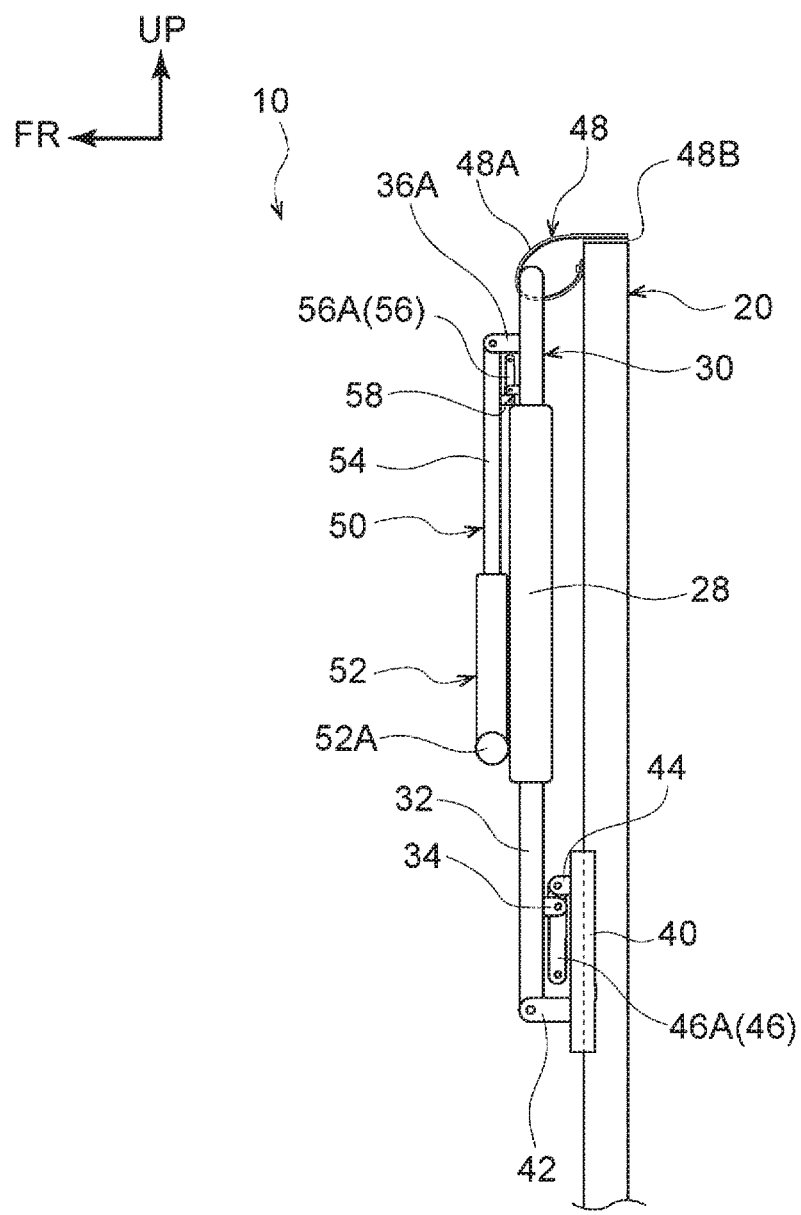
FIG. 6 is a side view illustrating a stored state of the support frame constituting the wheelchair passenger restraint structure according to the first embodiment.

Further, the support frame 30 is configured to be storable on and unfoldable from the vertical wall 20. That is, a front end part of the support frame 30 is caused to pivot upward around a part pivotally connected to the bracket 42 as a pivot point. Hereby, the connecting member 46 is folded (a pivotally connected part between the plate 46A and the plate 46B pivots), so that the support frame 30 is placed along the vertical wall 20 as illustrated in FIG. 6.

Note that, as a holding tool configured to hold the support frame 30 on the vertical wall 20, a loop portion 48A of a hook-and-loop fastener 48 is provided in an upper end part of a front face of the vertical wall 20, for example, and a hook portion 48B of the hook-and-loop fastener 48 is provided on a top face of the vertical wall 20. Accordingly, the support frame 30 in a stored state is held on the vertical wall 20 such that the loop portion 48A of the hook-and-loop fastener 48 is passed through a front end part of the body portion 32 and attached to the hook portion 48B of the hook-and-loop fastener 48 so that the support frame 30 is not brought into the unfolded state unintentionally.

Further, as illustrated in FIG. 4, two support rods 36, 38 extending in the vehicle width direction are provided in a front part of the support frame 30 in the unfolded state such that the two support rods 36, 38 are arranged in the front-rear direction. As illustrated in FIGS. 2, 3, 5, a pair of right and left flat-shaped brackets 36A is integrally provided generally in a central part, in the vehicle width direction, of the support rod 36 on the front side so that the brackets 36A project downward. A flat-shaped bracket 38A is integrally provided generally in a central part, in the vehicle width direction, of the support rod 38 on the rear side so that the bracket 38A projects downward.

Further, the front part (the support rod 36) of the support frame 30 is provided with the support leg 50 as a support member for supporting the front part from below. As illustrated in FIG. 3, the support leg 50 includes a body portion 52 constituted by a metal pipe and formed generally in a reverse "T" shape. A lower end 52A, of the body portion 52, that extends in the vehicle width direction is placed in a state where the lower end 52A makes contact with a top face of the floor 18. A rod 54 made of metal and having a cylindrical shape is inserted into a cylindrical portion 53, of the body portion 52, that extends upward, so that the rod 54 is locked and fixed to the cylindrical portion 53.

Figure 7:
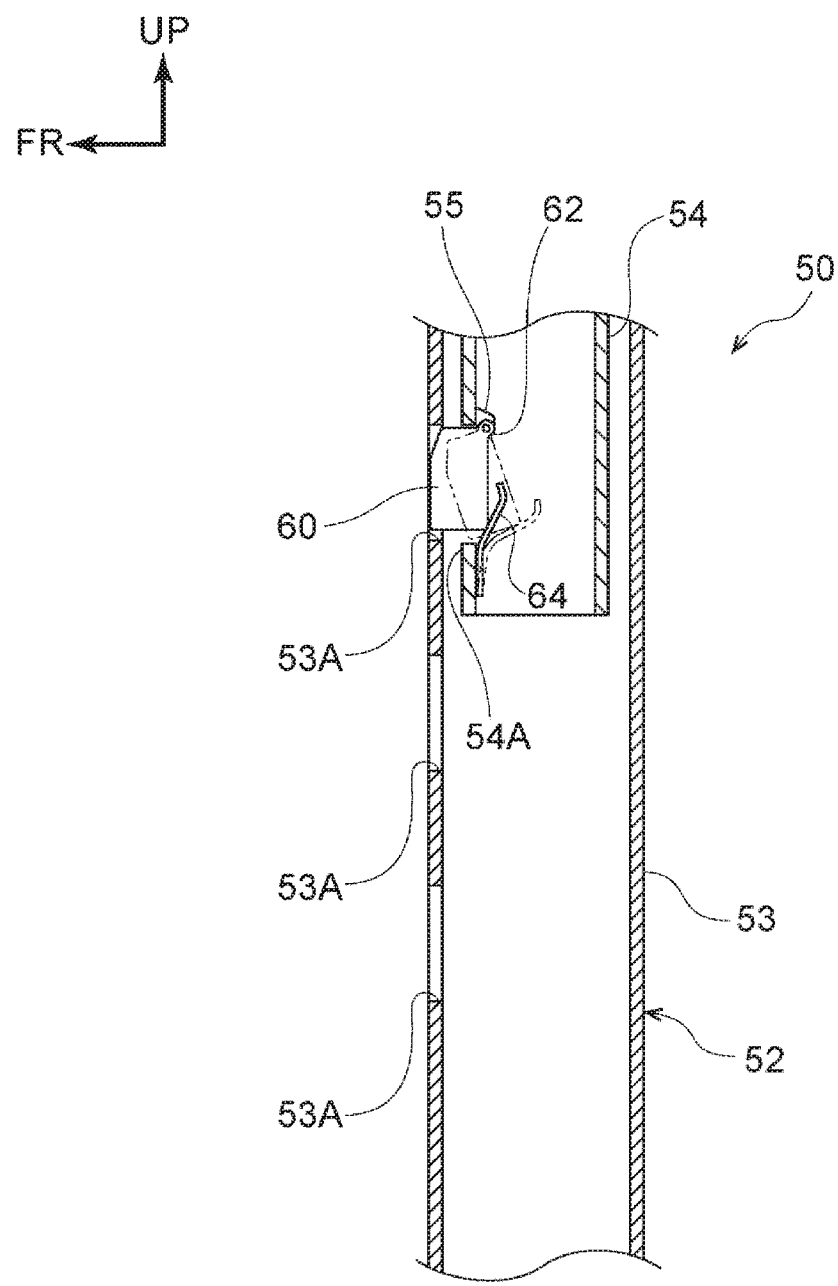
FIG. 7 is a sectional view illustrating, in an enlarged manner, length adjuster for a support leg provided in the support frame constituting the wheelchair passenger restraint structure according to the first embodiment.

More specifically, as illustrated in FIG. 7, an opening 54A is formed on a peripheral surface of a lower end part of the rod 54, and a projection member 60 projectable from the opening 54A is provided in the lower end part of the rod 54. That is, an upper end part 62 of the projection member 60 is pivotally connected to a bracket 55 provided on an inner peripheral surface above the opening 54A in the rod 54, and when the projection member 60 pivots around a pivotally connected part, the projection member 60 is projectable from the opening 54A and retractable into the opening 54A.

Further, a first end part of a leaf spring 64 as a biasing member is attached to an inner peripheral surface below the opening 54A in the rod 54, and a second end part of the leaf spring 64 biases a lower end part of the projection member 60 outwardly in the radial direction of the rod 54. That is, due to a biasing force of the leaf spring 64, the projection member 60 is always biased to a direction where the projection member 60 projects from the opening 54A. The cylindrical portion 53 of the body portion 52 has a plurality of openings 53A through which the projection member 60 is passed from an inner side in the radial direction, such that the openings 53A are formed at regular intervals along the axial direction of the cylindrical portion 53.

Accordingly, when a projection amount (the length of the support leg 50) of the rod 54 from the cylindrical portion 53 of the body portion 52 is adjusted, the projection member 60 is pushed radially inwardly against the biasing force of the leaf spring 64, so that the rod 54 is moved in the axial direction of the cylindrical portion 53, and the projection member 60 projects from the opening 53A provided at a desired height position. Hereby, the projection member 60 is locked to the opening 53A, and the rod 54 is fixed to the cylindrical portion 53. Thus, the length of the support leg 50 is adjustable (stretchable by length adjuster).

Further, as illustrated in FIGS. 5, 6, the support leg 50 is configured to be storable on and unfoldable from the support frame 30. That is, an upper end part of the rod 54 is placed between the right and left brackets 36A formed in the support rod 36 (see FIG. 3) and is pivotally connected to the right and left brackets 36A. A bracket 58 is integrally provided in an upper part of the rod 54 so as to project rearward, and the bracket 58 and the bracket 38A formed in the support rod 38 are connected to each other via a connecting member 56.

The connecting member 56 is constituted by two elongated flat-shaped plates 56A, 56B, and a first end part of the plate 56A is pivotally connected to a first end part of the plate 56B. A second end part of the plate 56A is pivotally connected to the bracket 58, and a second end part of the plate 56B is pivotally connected to the bracket 38A. With such a configuration, the support leg 50 is pivotally provided in the front part of the support frame 30 and is storable on and unfoldable from the support frame 30.

That is, when the support frame 30 is brought into the stored state, for example, the support leg 50 pivots around a part pivotally connected to the brackets 36A as a pivot point, so that the connecting member 56 is folded (a pivotally connected part between the plate 56A and the plate 56B pivots). Hereby, the support leg 50 is brought into a stored state where the support leg 50 is placed along the support frame 30 as illustrated in FIG. 6. Note that the support leg 50 in the stored state is also held on the support frame 30 by a holding tool such as a hook-and-loop fastener (not shown).

Further, after the support frame 30 is passed through the gap G above the cross pipes 88 and placed on the bottom face side of the seating face 86 of the wheelchair 80, the body portion 52 of the support leg 50 is caused to pivot forward around the part pivotally connected to the brackets 36A as a pivot point, so that the connecting member 56 is extended (the pivotally connected part between the plate 56A and the plate 56B is caused to pivot). Hereby, the support leg 50 is brought into an unfolded state as illustrated in FIGS. 2, 3, 5. Note that, in FIGS. 2, 3, the connecting members 46, 56 are not illustrated.

Next will be described an operation of the wheelchair passenger restraint structure 10 according to the first embodiment configured as described above.

When the passenger P of the wheelchair 80 gets on the bus 12, the loop portion 48A of the hook-and-loop fastener 48 is detached from the hook portion 48B so that the support frame 30 is brought into the unfolded state. Note that, at this time, the support leg 50 remains in the stored state. Further, the support plate 40 is moved along the guide rail as needed, so that the height position of the support frame 30 is adjusted to the height position of the seating face 86 of the wheelchair 80 (the position of the support frame 30 in the up-down direction is adjusted).

The passenger P of the wheelchair 80 boarded on the bus 12 moves backward toward the vertical wall 20 to be boarded in the wheelchair space Ws. Then, the support frame 30 in the unfolded state (the support leg 50 is in the stored state) is inserted through the gap G above the cross pipes 88 from the relatively rear side. Hereby, the cushion portion 28 of the support frame 30 is placed right under the seating face 86 of the wheelchair 80.

Subsequently, the body portion 52 of the support leg 50 is caused to pivot forward, so that the support leg 50 is brought into the unfolded state. The projection amount of the rod 54 from the cylindrical portion 53 is adjusted as needed. That is, the projection member 60 is caused to project from a desired opening 53A and then locked and fixed, so that the length of the support leg 50 is adjusted. Then, the lower end part 52A of the body portion 52 of the support leg 50 is brought into contact with the top face of the floor 18.

As described above, the rear end parts of the support frame 30 are supported by the vertical wall 20, and the front part of the support frame 30 is supported by the floor 18 via the support leg 50. Then, the seating face 86 of the wheelchair 80 boarded in a forward facing posture is held from below by the cushion portion 28 of the support frame 30. That is, insufficiency in the seating face strength of the wheelchair 80 is restrained by the cushion portion 28 of the support frame 30.

Accordingly, when the bus 12 has a front end collision and a load directed diagonally forward and downward is applied to the passenger P of the wheelchair 80, the load is received by the cushion portion 28 of the support frame 30. Accordingly, it is possible to restrain the passenger P of the wheelchair 80 from moving diagonally forward and downward, thereby making it possible to restrain occurrence of a submarine phenomenon to the passenger P of the wheelchair 80.

Further, as described above, the position (the height position) of the support frame 30 in the up-down direction is adjustable relative to the vertical wall 20. Further, the length of the support leg 50 is also adjustable. Accordingly, even if the height of the seating face 86 varies depending on the type (difference in specification) of the wheelchair 80, the support frame 30 can deal with the variation.

Further, the support frame 30 includes the support leg 50 configured to support the front part of the support frame 30 from below. Accordingly, a load transmitted to the rear end parts of the support frame 30 is transmitted to the vertical wall 20 (the rear wall 14) via the brackets 42, the support plate 40, and so on. In the meantime, a load transmitted to the front part of the support frame 30 is transmitted to the floor 18 of the vehicle cabin S via the support leg 50. This accordingly makes it possible to improve a withstand load of the support frame 30 when the bus 12 has a frond end collision.

Further, the support frame 30 is storable on the vertical wall 20. Accordingly, when the passenger P of the wheelchair 80 is not boarded on the bus 12, the support frame 30 (including the support leg 50) can be placed along the vertical wall 20. This accordingly makes it possible to restrain the support frame 30 (including the support leg 50) from becoming obstructive, thereby making it possible to effectively use a space of the vehicle cabin S.

Modifications

Figure 8:
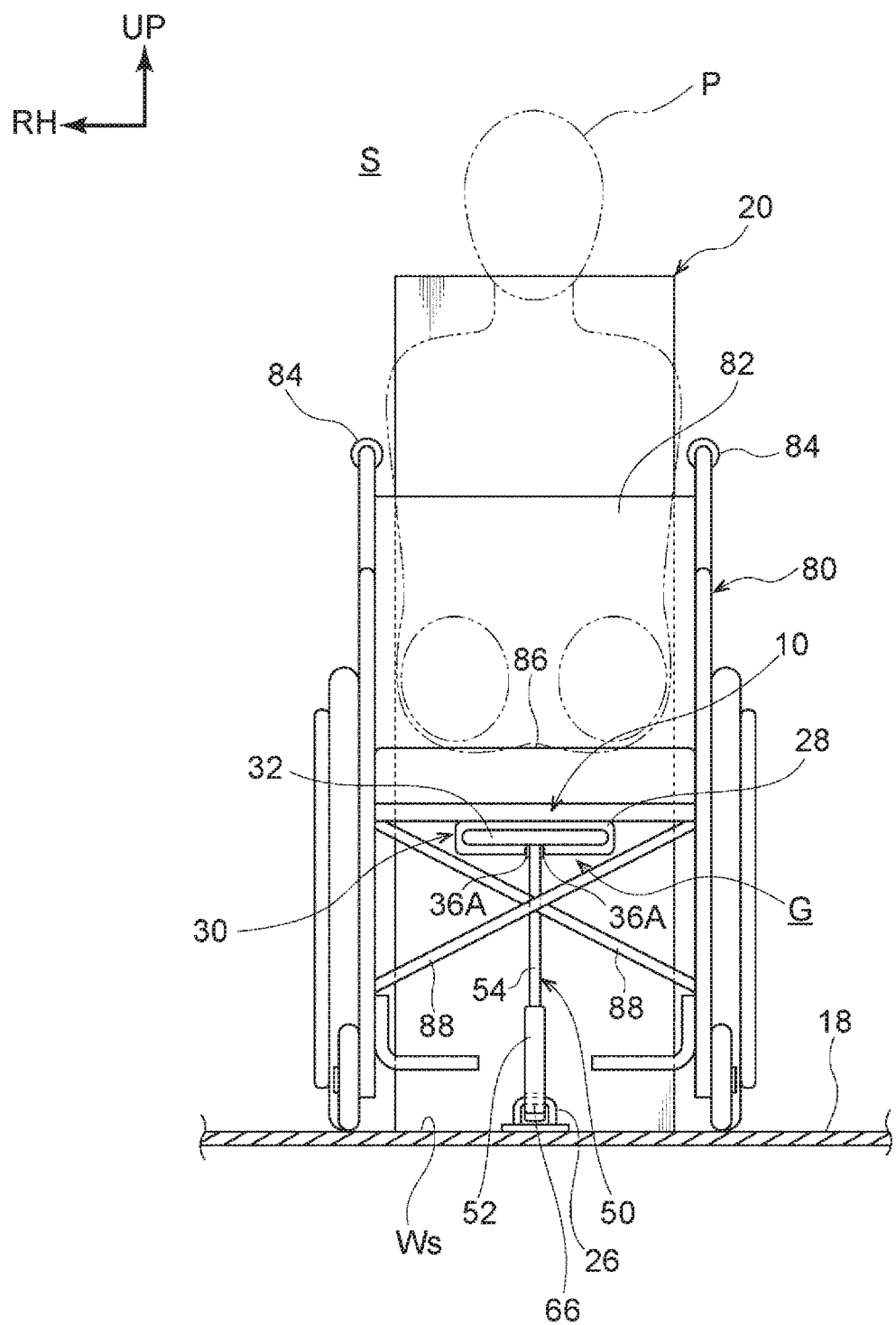
FIG. 8 is a front view illustrating a state where a lower end part of the support leg is locked to an anchor, the support leg being provided in the support frame constituting the wheelchair passenger restraint structure according to the first embodiment.

Note that, as illustrated in FIG. 8, an anchor 26 as a locking portion having a generally reverse "U" shape in a front view may be provided on the floor 18 of the vehicle cabin S. An ISOFIX-system connector 66, for example, may be provided in a lower end part of the body portion 52 in the support leg 50. That is, the lower end part of the support leg 50 (the body portion 52) may be locked and fixed to the anchor 26 provided on the floor 18.

With such a configuration, the lower end part of the support leg 50 (the body portion 52) does not slide over the top face of the floor 18, so that a load transmitted to the front part of the support frame 30 can be efficiently transmitted to the floor 18 of the vehicle cabin S via the support leg 50 and the anchor 26. This accordingly makes it possible to further improve a withstand load of the support frame 30 when the bus 12 has a frond end collision.

Figure 9:
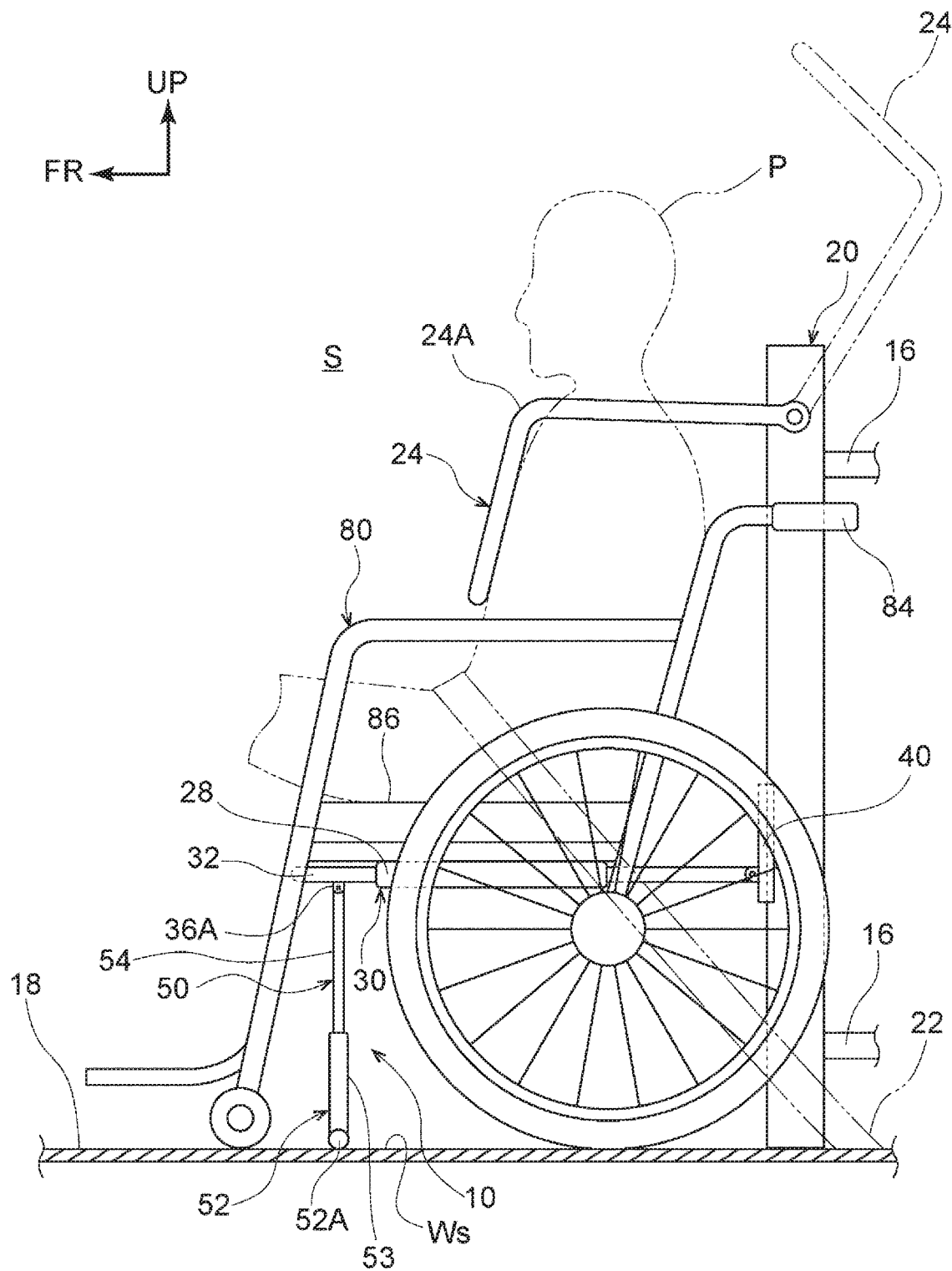
FIG. 9 is a side view illustrating a guide bar provided in a vertical wall constituting the wheelchair passenger restraint structure according to the first embodiment.

Further, as illustrated in FIG. 9, a guide bar 24 configured to restrain the chest of the passenger P of the wheelchair 80 may be provided in an upper part of the vertical wall 20. The guide bar 24 is constituted by a metal or plastic pipe. The guide bar 24 is formed into a generally reverse "U" shape in a front view and is also formed into a generally "L" shape in a side view such that a bending portion 24A is placed on the upper side in a restraining state to the passenger P of the wheelchair 80. Right and left end parts of the guide bar 24 are pivotally connected on side faces of the vertical wall 20.

With the use of such a guide bar 24, when the bus 12 has a front end collision, the chest of the passenger P of the wheelchair 80 is restrained, and the passenger P of the wheelchair 80 can grip the guide bar 24. Accordingly, even when a load directed diagonally forward and downward is applied to the passenger P of the wheelchair 80, it is possible to restrain the passenger P of the wheelchair 80 from moving diagonally forward and downward, thereby making it possible to restrain occurrence of a submarine phenomenon to the passenger P of the wheelchair 80. Note that the guide bar 24 may be provided instead of the seatbelt 22.

Second Embodiment

Next will be described the wheelchair passenger restraint structure 10 according to a second embodiment. Note that a portion equivalent to a portion in the first embodiment has the same reference sign as the portion in the first embodiment, and detailed descriptions thereof (including common operations) are omitted appropriately.

Figure 10:
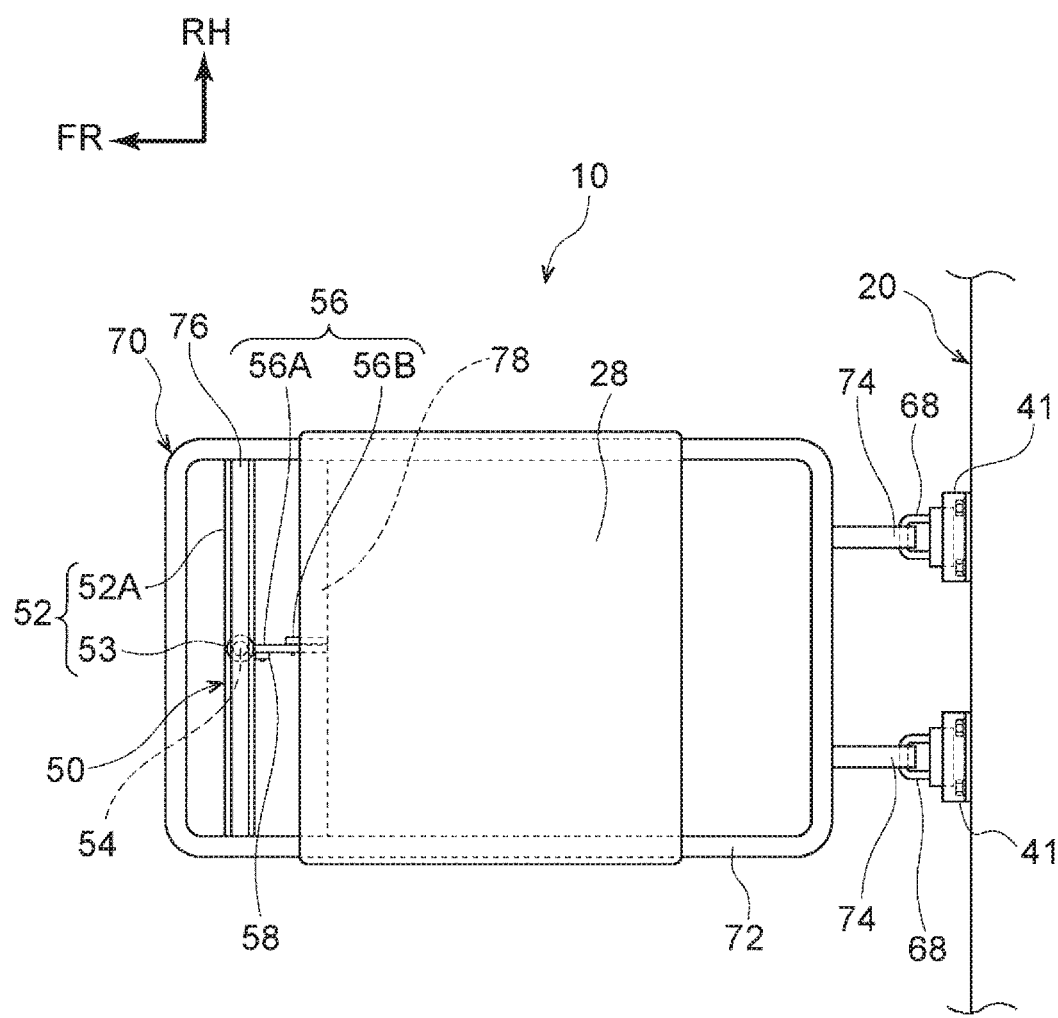
FIG. 10 is a plan view illustrating a support frame constituting a wheelchair passenger restraint structure according to a second embodiment.
Figure 11:
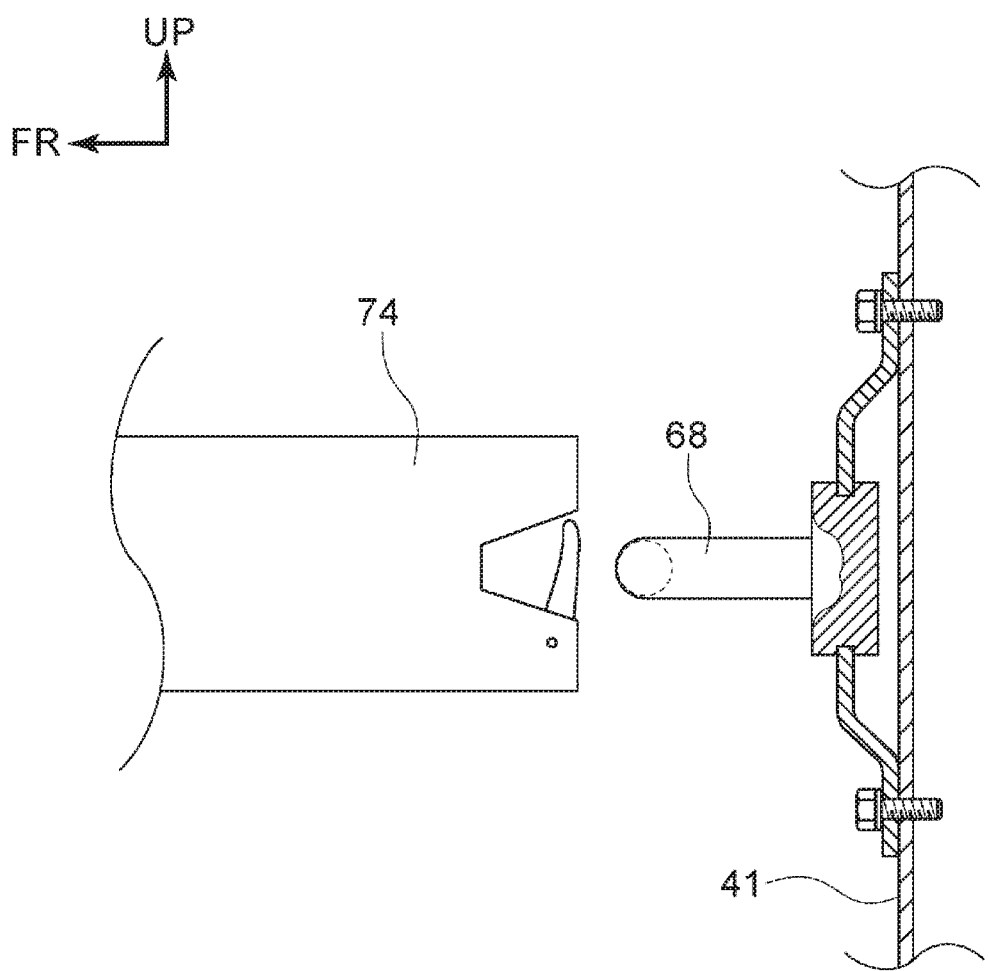
FIG. 11 is a side view illustrating, in an enlarged manner, an attachment-detachment structure of the support frame constituting the wheelchair passenger restraint structure according to the second embodiment.

As illustrated in FIG. 10, in a support frame 70 in the second embodiment, a body portion 72 having a generally rectangular annular shape (frame shape) in a plan view with its longitudinal direction being along the front-rear direction is formed to be wider than the body portion 32 of the support frame 30 in the first embodiment. As illustrated in FIGS. 10, 11, a pair of right and left ISOFIX-system connectors 74 is provided in a rear end part of the body portion 72 such that the connectors 74 project rearward. Note that two support rods 76, 78 extending in the vehicle width direction are provided in a front part of the support frame 70 such that the two support rods 76, 78 are arranged in the front-rear direction.

Further, the vertical wall 20 is provided with a pair of right and left support plates 41 configured to be movable in the up-down direction along guide rails (not shown) provided on a front face of the vertical wall 20. The support plates 41 are configured to be movable in the up-down direction and stoppable at a given position in a synchronized manner. An anchor 68 having a generally "U" shape in a plan view such that the anchor 68 is opened rearward is provided on a front face of each of the support plates 41. Each of the connectors 74 is configured to be locked and fixed to its corresponding anchor 68.

That is, the support frame 70 is configured to be attachable to and detachable from the vertical wall 20 by an attachment-detachment structure using the ISOFIX system. Accordingly, regardless of the structure (specification) of the wheelchair 80, the support frame 70 can be inserted from the front side of the wheelchair 80, so that the width of the support frame 70 can be made large so as to correspond to the width of the seating face 86 of the wheelchair 80.

More specifically, generally, the cross pipes 88 are provided in a lower side of a rear part of the wheelchair 80 (right under the back support 82) so that the wheelchair 80 is easily foldable. On this account, like the support frame 30 in the first embodiment, in a case where the support frame 30 is provided so as not to be removable from the vertical wall 20, the support frame 30 is inserted through the gap G above the cross pipes 88 from the relatively rear side. Therefore, it is difficult to set the support frame 30 to have a large width.

On the other hand, in a case of the support frame 70 in the second embodiment, the support frame 70 is attachable to and detachable from the vertical wall 20. Accordingly, only the connectors 74 are passed through the gap G above the cross pipes 88. Accordingly, as described above, the support frame 70 can be inserted from the front side of the wheelchair 80, thereby making it possible to set the support frame 70 to have a large width. Hereby, even when the bus 12 has a front end collision and a load directed diagonally forward and downward is applied to the passenger P of the wheelchair 80, the load can be more effectively received by the cushion portion 28 of the support frame 70.

Note that, when the passenger P of the wheelchair 80 is not boarded, the support frame 70 is removed from the vertical wall 20 and stored by a holder (not shown) provided on the rear wall 14 of the bus 12, a rear face of the vertical wall 20, or the like. Further, as illustrated in FIG. 10, the support frame 70 (the support rod 76) is also provided with the support leg 50, and the support frame 70 is supported by the support leg 50 and the vertical wall 20. Further, the length of the lower end part 52A of the body portion 52 of the support leg 50 may be the same length as in the first embodiment or may be formed to be long in the vehicle width direction in accordance with the width of the support frame 70.

The wheelchair passenger restraint structure 10 according to the present embodiment has been described with reference to the drawings. However, the wheelchair passenger restraint structure 10 according to the present embodiment is not limited to those illustrated in the drawings, and its design is modifiable appropriately within a range that does not deviate from the gist of the present disclosure. For example, a pair of right and left poles (not shown) may be provided on the floor 18 of the bus 12 in a standing manner (or provided on a roof in a hanging manner), and the vertical wall 20 may be configured to be supported by a pair of upper and lower brackets 16 provided on each of the right and left poles so as to project forward.

Further, the biasing member configured to bias the projection member 60 is not limited to the leaf spring 64 and may be a coil spring (not shown) or the like, for example. Further, the holding tool configured to hold the support frame 30 on the vertical wall 20 when the support frame 30 is stored (placed along the vertical wall 20) is not limited to the hook-and-loop fastener 48 and may be a pivotable hook (not shown) or the like, for example.

Further, the support frame 30 (including the support leg 50) in the first embodiment and the support frame 70 (including the support leg 50) in the second embodiment are usable as an auxiliary seat on which an ordinary passenger can be seated when the passenger P of the wheelchair 80 is not boarded.

What is claimed is:

1. A wheelchair passenger restraint structure comprising:
a wheelchair space set in a vehicle cabin so that a passenger of a wheelchair is to be boarded in a forward facing posture;
a seatbelt configured to restrain an abdomen part of the passenger of the wheelchair boarded in the wheelchair space;
a vertical wall fixedly secured to a rear wall of the vehicle cabin, the vertical wall provided behind the wheelchair space in a vehicle-body front-rear direction; and
a holding member supported by the vertical wall, the holding member being configured to hold a seating face of the wheelchair from below in a vehicle-body up-down direction.

2. The wheelchair passenger restraint structure according to claim 1, wherein a position of the holding member in the vehicle-body up-down direction is adjustable relative to the vertical wall.

3. The wheelchair passenger restraint structure according to claim 1, wherein the holding member is configured to be storable on and unfoldable from the vertical wall.

4. The wheelchair passenger restraint structure according to claim 1, wherein the holding member is configured to be attachable to and detachable from the vertical wall.

5. The wheelchair passenger restraint structure according to claim 1, wherein the holding member includes a support member configured to be storable on and unfoldable from the holding member and to support a front part of the holding member from below in the vehicle-body up-down direction.

6. The wheelchair passenger restraint structure according to claim 5, wherein a length of the support member is adjustable.

7. The wheelchair passenger restraint structure according to claim 5, wherein a lower end part of the support member is lockable to a locking portion provided on a floor of the vehicle cabin.

8. The wheelchair passenger restraint structure according to claim 1, wherein the vertical wall is configured such that a height of the vertical wall is higher than a height of the wheelchair but is smaller than a height of an adult passenger seated in the wheelchair.

9. The wheelchair passenger restraint structure according to claim 1, wherein the vertical wall is formed such that a width of the vertical wall is generally a same width of a back support of the wheelchair, and
wherein the vertical wall is configured to be positioned between a pair of push handles of the wheelchair.

10. The wheelchair passenger restraint structure according to claim 1, wherein when the passenger of the wheelchair moves backwards toward the vertical wall to be boarded in the wheelchair space, the holding member in an unfolded state is inserted through a gap above cross pipes from a relatively rear side and a cushion portion of the holding member is placed on a bottom face side of the seating face of the wheelchair.

11. The wheelchair passenger restraint structure according to claim 1, wherein a guide bar is configured to restrain a chest of the passenger of the wheelchair, the guide bar is provided in an upper part of the vertical wall, the guide bar has a generally reverse U-shape in a front view and has a generally L-shape in a side view such that a bending portion is placed on the upper side in a restraining state to the passenger of the wheelchair.

12. A wheelchair passenger restraint structure comprising:
a wheelchair space set in a vehicle cabin so that a passenger of a wheelchair is to be boarded in a forward facing posture;
a seatbelt configured to restrain an abdomen part of the passenger of the wheelchair boarded in the wheelchair space;
a vertical wall provided behind the wheelchair space in a vehicle-body front-rear direction; and
a holding member supported by the vertical wall, the holding member being configured to hold a seating face of the wheelchair from below in a vehicle-body up-down direction, the holding member is configured to be storable on and unfoldable from the vertical wall.

13. The wheelchair passenger restraint structure according to claim 12, wherein the holding member is configured to be attachable to and detachable from the vertical wall.

14. The wheelchair passenger restraint structure according to claim 12, wherein the holding member includes a support member configured to be storable on and unfoldable from the holding member and to support a front part of the holding member from below in the vehicle-body up-down direction.

15. The wheelchair passenger restraint structure according to claim 14, wherein a length of the support member is adjustable.

16. The wheelchair passenger restraint structure according to claim 14, wherein a lower end part of the support member is lockable to a locking portion provided on a floor of the vehicle cabin.

17. The wheelchair passenger restraint structure according to claim 12, wherein the vertical wall is configured such that a height of the vertical wall is higher than a height of the wheelchair but is smaller than a height of an adult passenger seated in the wheelchair.

18. The wheelchair passenger restraint structure according to claim 12, wherein the vertical wall is formed such that a width of the vertical wall is generally a same width of a back support of the wheelchair, and wherein the vertical wall is configured to be positioned between a pair of push handles of the wheelchair.

19. The wheelchair passenger restraint structure according to claim 12, wherein when the passenger of the wheelchair moves backwards toward the vertical wall to be boarded in the wheelchair space, the holding member in an unfolded state is inserted through a gap above cross pipes from a relatively rear side and a cushion portion of the holding member is placed on a bottom face side of the seating face of the wheelchair.

20. The wheelchair passenger restraint structure according to claim 12, wherein a guide bar is configured to restrain a chest of the passenger of the wheelchair, the guide bar is provided in an upper part of the vertical wall, the guide bar has a generally reverse U-shape in a front view and has a generally L-shape in a side view such that a bending portion is placed on the upper side in a restraining state to the passenger of the wheelchair.

\* \* \* \* \*